(12) United States Patent
Takumi et al.

(10) Patent No.: US 7,290,937 B2
(45) Date of Patent: Nov. 6, 2007

(54) SLIDE BEARING FOR COOLING WATER CIRCULATION PUMP IN FUEL CELL

(75) Inventors: Hayashi Takumi, Inabe (JP); Fukuzawa Satoru, Inabe (JP)

(73) Assignee: NTN Corporation, Osaka (JP)

( * ) Notice: Subject to any disclaimer, the term of this patent is extended or adjusted under 35 U.S.C. 154(b) by 330 days.

(21) Appl. No.: 11/156,474

(22) Filed: Jun. 21, 2005

(65) Prior Publication Data
US 2005/0281498 A1 Dec. 22, 2005

(30) Foreign Application Priority Data
Jun. 22, 2004 (JP) ............................. 2004-183478

(51) Int. Cl.
*F16C 17/02* (2006.01)
(52) U.S. Cl. ...................................... 384/297; 384/909

(58) Field of Classification Search ................ 384/279, 384/909, 299, 300, 298
See application file for complete search history.

(56) References Cited

FOREIGN PATENT DOCUMENTS

| JP | 6-116494 | 4/1994 |
|---|---|---|
| JP | 2002-139045 | 5/2002 |

*Primary Examiner*—Lenard A. Footland
(74) *Attorney, Agent, or Firm*—Wenderoth, Lind & Ponack, L.L.P.

(57) ABSTRACT

A slide bearing is proposed which rotatably supports a rotary shaft of an impeller in a cooling water circulation pump mounted to a fuel cell. The slide bearing is formed of a synthetic resin containing no metal ions such as polyetherketone resin. This prevents impurities originating from the slide bearing from being dissolved into cooling water for the fuel cell.

4 Claims, 1 Drawing Sheet

SLIDE BEARING FOR COOLING WATER CIRCULATION PUMP IN FUEL CELL

BACKGROUND OF THE INVENTION

The present invention relates to a slide bearing for cooling water circulation pump employed in a fuel cell.

FIG. 1 shows a conventional electric water pump, which includes a housing 1, and a rotary shaft 3 having both ends thereof supported on the housing 1 through slide bearings 2 and 6. An impeller 4 is fixed to one end of the rotary shaft 3. A rotary member 5 is integrally formed on the rotary shaft 3. In order to activate the pump, i.e. to produce a water flow in the pump chamber as shown by arrows in FIG. 1, the rotary member 5 is driven by an electric motor to rotate the impeller 4.

In addition to the slide bearings 2 and 6, a mechanical seal (not shown) may also be mounted on the rotary shaft 3 of the water pump to seal the gap between the rotary shaft 3 and the slide bearing 6, thereby preventing entry of water or vapor into the drive unit such as an electric motor.

Some conventional water pumps for circulating cooling water for motor vehicle engines and other water pumps used in motor vehicles have their parts formed of a polyphenylene sulfide resin composition (see JP patent publication 6-116494).

JP patent publication 2002-139045 discloses a water pump for a motor vehicle in which its rotary shaft is supported on the housing through slide bearings made of a resin. In order that the slide bearings maintain high slidability, wear resistance and mechanical strength for a prolonged period of time even if the slide bearings are kept in contact with an anti freeze at a high or low temperature, the slide bearings are made of a polyetherketone resin.

If this type of conventional slide bearings for an automobile water pump are used as slide bearings for a cooling water circulation pump in a fuel cell, the performance of the fuel cell often declines.

This is because if such slide bearings are used in a fuel cell, impurities tend to mix into pure water used as a coolant in the fuel cell, thereby lowering the efficiency of the fuel cell and also shortening the life of the fuel cell. But the exact cause for the increase in impurities has not been known and therefore no concrete measures thereagainst have been established so far.

Since it was impossible to completely prevent mixing of impurities into the coolant because its cause is unknown, it was possible only to remove impurities with e.g. a water purifier.

An object of the present invention is to provide a slide bearing which will not cause impurities to be mixed into a coolant of a fuel cell when used in the fuel cell.

SUMMARY OF THE INVENTION

According to the present invention, there is provided a slide bearing rotatably supporting a rotary shaft of an impeller in a cooling water circulation pump mounted to a fuel cell, the slide bearing being formed of a synthetic resin containing no metal ions.

Since the slide bearing according to the present invention is formed of a resin containing no metal ions, and besides the base resin, any additives such as reinforcing agents and lubricants also contain no metal ions such as Na ions, even when the bearing is brought into contact with the cooling water, no metal ions will dissolve into the cooling water.

Thus, the bearing according to the present invention will not pollute the cooling water of the fuel cell, and thus will not lower the efficiency of the fuel cell, thereby prolonging its life.

To avoid mixing of impurities into the cooling water, thereby prolonging the life of the fuel cell, as the synthetic resin containing no metal ions, a polyetherketone resin is preferably selected.

Also, the slide bearing preferably contains at least one filler selected from the group consisting of fluororesins, carbon fibers, graphite and aramid fibers.

With this arrangement, since the slide bearing is formed of a synthetic resin containing no metal ions, no impurities will dissolve into the cooling water for the fuel cell. That is, the bearing will not be a source of pollution of the cooling water. Since the cooling water is kept clean, the fuel cell will maintain high efficiency, and its life is long.

BRIEF DESCRIPTION OF THE DRAWINGS

Other features and objects of the present invention will become apparent from the following description made with reference to the accompanying drawing, in which.

DETAILED DESCRIPTION OF THE PREFERRED EMBODIMENTS

Figure 1:
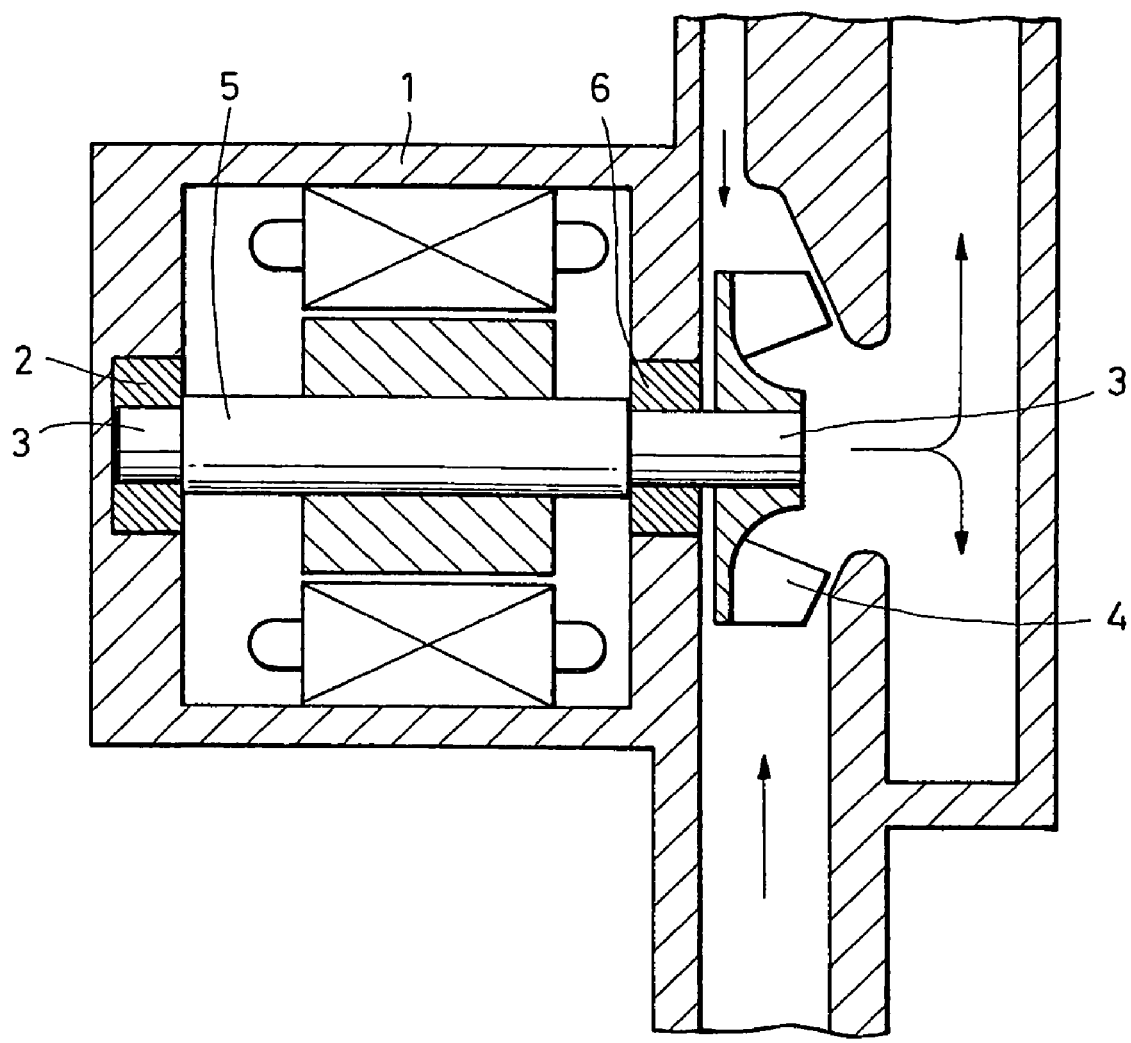
FIG. 1 is a schematic view of a cooling water circulation pump including slide bearings.

Slide bearings according to the present invention are of the same structure as those shown in FIG. 1. Thus, the slide bearings according to the present invention are also designated by numerals 2 and 6 in FIG. 1. The slide bearings 2 and 6 are mounted to the housing 1 of the cooling water circulating pump and rotatably support both ends of the rotary shaft 3. When the motor is activated, the rotary member 5 integral with the rotary shaft 3 is driven and the impeller 4 fixed to one end of the rotary shaft 3 is rotated, so that a water flow is produced in the pump chamber (see the arrows in FIG. 1).

The synthetic resin containing no metal ions employed in the present invention is a resin that does not contain any metal ions such as Na ions, the least favorable metal ions, and does not produce any metal ions as byproducts or during the production process.

Polyphenylene sulfide resin is one of the resins that cannot be employed in the present invention, because in the production process thereof sodium chloride is produced as a byproduct, which can never be removed anyhow.

On the other hand, preferable synthetic resins containing no metal ions which can be employed in the present invention include polyetherketone resins. Polyetherketone resins include various kinds of aromatic polyketones such as polyetherketone (PEK), polyether etherketone (PEEK) and polyetherketone etherketone ketone (PEKEKK), wherein aromatic rings are coupled together through ether bonds (—O—) and ketone bonds (—CO—).

Commercially available polyetherketone resins include PEEK-HT22 (made by Victrex Corp; Formula 1), PEEK150P (made by Victrex; Formula 2), HOSTATEC (made by Höchst; Formula 3), and Ultrapek-A2000 (made by BASF; Formula 4).

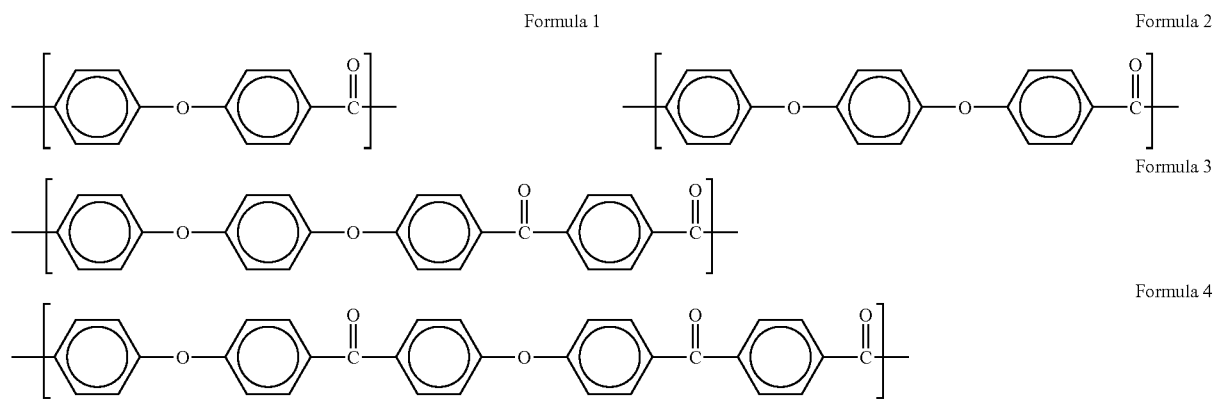

In order for the polyetherketone resin used in the present invention to possess desired or necessary characteristics, fibrous, plate-shaped, powdery and/or granular fillers may be added. Such fillers include fibrous or needlelike fibers including glass fiber, PAN or pitch carbon fiber, organic fibers such as aramid fibers, ceramic fibers, alumina fibers, titanium oxide whiskers, silicon carbide whiskers, potassium titanate whiskers, barium titanate whiskers, aluminum borate whiskers, silicon nitride whiskers, or powdery, granular or plate-shaped fillers such as titanium oxide, zinc oxide and graphite.

In order to improve the mechanical strength and wear resistance of such polyetherketone resins, fibrous fillers such as carbon fiber or aramid fiber or solid lubricants such as fluororesins or graphite are preferably added. Preferably, such fillers and/or lubricants are added by 3 to 60 parts by weight based on 100 parts by weight of the polyetherketone resin, because if less than 3 parts by weight, the reinforcing effect cannot be expected and if over 60 parts by weight, formability will deteriorate.

The most preferable fiber filler to be added is carbon fiber, which should be added by 5 to 40 parts by weight, preferably 10 to 30 parts by weight, based on 100 parts by weight of the polyetherketone resin.

Preferable solid lubricants to be added include fluororesin powders such as PTFE and PFA and graphite.

Such solid lubricants should be added by 1 to 40 parts by weight, preferably 5 to 30 parts by weight, more preferably 5 to 20 parts by weight, based on 100 parts by weight of the polyetherketone resin.

To mix these materials together, they may be separately supplied into a melt mixer, or may be supplied into a melt mixer after dry-mixing them together in a general purpose mixer such as a Henschel mixer, tumbler mixer or ribbon blender.

The mixtures thus obtained were heated to a temperature of 400 to 420° C. to plasticize them. The plasticized mixtures were then put in molds, allowed to harden, and released from the molds. Cylindrical or otherwise shaped slide bearings were thus obtained.

EXAMPLES

The following are resin materials, reinforcing materials, and other additives used in Examples of the invention and Comparative Examples.

(1) Polyetherketone resin [PEEK] (PEEK150P; made by Victrex plc)
(2) Polyphenylene sulfide resin [PPS] (T-4; made by DIC EP Inc.)
(3) Carbon fiber [CF] (Kreca Chop M104T; made by Kureha Chemical Industry Co., Ltd.)
(4) Glass fiber [GF] (MF06JB1-20A; made by Asahi Fiber Glass Co.)
(5) Aramid fiber (Twaron 0.25 mm; made by AKZO Nobel N.V.)
(6) PTFE powder [PTFE] (KT400H; made by KITAMURA Ltd.)
(7) Graphite (ACP; made by Nippon Graphite)

Examples 1-5 of the Invention; Comparative Examples 1 and 2

Each of the base resins shown in Table 1 and other fillers were dry-blended in a Henschel mixer, and the mixture obtained was melt-kneaded and pelletized in a twin-screw extruder. The pellets obtained were then dried and formed into test specimens in an injection molder (made by Sodick Plustech Co., Ltd.).

The test specimens were evaluated for (a) wear resistance, (b) damage to mating members, and (c) amount of elution of ions.

(a) Wear resistance: Cylindrical test specimens having an inner diameter of 17 mm, an outer diameter of 21 mm and a length of 10 mm were subjected to a thrust type wear test in pure water (speed: 150 m/minute, load: 0.5 MPa, test duration: 50 hours, mating member: SUS304), and the amount of wear was determined from the difference in weight of each specimen before and after the test.

(b) Damage to mating members: Damage to the sliding surface of each mating member used in the thrust type wear test was measured with a surface roughness measuring instrument. In Table 1 ☉ represents damage less than 0.005 mm in depth, Δ represents damage of 0.005 to 0.010 mm in depth, and X represents damage of more than 0.01 mm in depth.

(c) Amount of elution of ions: 10 grams of pellets were immersed in 200 ml of pure water, and the pure water was boiled for 48 hours. After cooling the water, the amount of ions in the water was measured by atomic spectrophotometry.

TABLE 1

|  |  | Examples of the Invention | | | | | Comparative Examples | |
|---|---|---|---|---|---|---|---|---|
|  |  | 1 | 2 | 3 | 4 | 5 | 1 | 2 |
| Contents (parts by weight) | PEEK | 100 | 100 | 100 | 100 | 100 | — | — |
|  | PPS | — | — | — | — | — | 100 | 100 |
|  | CF | 30 | — | 5 | 50 | 10 | 30 | — |
|  | GF | — | — | — | — | — | — | 10 |
|  | Aramid fiber | — | 10 | — | — | — | — | 15 |
|  | PTFE | — | 20 | 30 | 5 | 10 | 10 | — |
|  | Graphite | — | — | — | — | 10 | — | 15 |
| Wear resistance |  | −0.012 | −0.021 | −0.018 | −0.015 | −0.008 | −0.060 | −0.321 |
| Damage to mating member |  | ⊚ | ⊚ | ⊚ | Δ | ⊚ | ⊚ | X |
| Amount of elution of ions (Na ions) |  | <0.1 ppm | <0.1 ppm | <0.1 ppm | <0.1 ppm | <0.1 ppm | 0.4 | 0.4 |

As is apparent from Table 1, in Examples 1-5 of the invention, only slight decreases in weight due to wear were observed and damage to mating members were also small. The amount of ion elution was also small. Examples 1-5 of the invention are therefore considered to be ideal materials for a slide bearing for use in a cooling water circulation pump for a fuel cell.

On the other hand, in Comparative Examples 1 and 2, since PPS, which is high in chemical resistance, was used instead of PEEK, Na ions were extracted, which makes Comparative Examples 1 and 2 unsuitable as materials for a slide bearing for a fuel cell.

What is claimed is:

1. A slide bearing rotatably supporting a rotary shaft of an impeller in a cooling water circulation pump mounted to a fuel cell, said slide bearing being formed of a synthetic resin containing no metal ions.

2. The slide bearing of claim 1 wherein said synthetic resin is a polyetherketone resin.

3. The slide bearing of claim 1 wherein to said synthetic resin, at least one of fillers selected from the group consisting of fluororesins, carbon fibers, graphite and aramid fibers is added.

4. The slide bearing of claim 2 wherein to said synthetic resin, at least one of fillers selected from the group consisting of fluororesins, carbon fibers, graphite and aramid fibers is added.

* * * * *

UNITED STATES PATENT AND TRADEMARK OFFICE
CERTIFICATE OF CORRECTION

PATENT NO. : 7,290,937 B2
APPLICATION NO. : 11/156474
DATED : November 6, 2007
INVENTOR(S) : Takumi Hayashi et al.

It is certified that error appears in the above-identified patent and that said Letters Patent is hereby corrected as shown below:

Title Page:
In item (12), change "Takumi et al." to --Hayashi et al.--; and

In item (75), change "Hayashi Takumi" to --Takumi Hayashi--, and change "Fukuzawa Satoru" to --Satoru Fukuzawa--.

Signed and Sealed this

Twenty Second Day of April, 2008

JON W. DUDAS
*Director of the United States Patent and Trademark Office*